(12) United States Patent
Higa et al.

(10) Patent No.: US 7,551,253 B2
(45) Date of Patent: Jun. 23, 2009

(54) LIQUID CRYSTAL DEVICE, METHOD FOR MANUFACTURING THE SAME, AND ELECTRONIC APPARATUS

(75) Inventors: Masakatsu Higa, Tottori (JP); Hiroshi Wada, Azumino (JP)

(73) Assignee: Epson Imaging Devices Corporation, Azumino-shi (JP)

( * ) Notice: Subject to any disclaimer, the term of this patent is extended or adjusted under 35 U.S.C. 154(b) by 179 days.

(21) Appl. No.: 11/882,834

(22) Filed: Aug. 6, 2007

(65) Prior Publication Data

US 2008/0074597 A1 Mar. 27, 2008

(30) Foreign Application Priority Data

Sep. 26, 2006 (JP) ............................ 2006-261096

(51) Int. Cl.
*G02F 1/1337* (2006.01)
(52) U.S. Cl. ...................... 349/126; 349/123; 349/139; 349/141; 349/187; 438/30
(58) Field of Classification Search ................ 349/123, 349/126, 132, 139, 141, 143, 187; 438/30; 257/E21.002
See application file for complete search history.

(56) References Cited

U.S. PATENT DOCUMENTS

| 6,646,707 | B2 | 11/2003 | Noh et al. |
| 6,710,835 | B2 | 3/2004 | Kurahashi et al. |
| 2004/0012739 | A1 | 1/2004 | Yoon et al. |
| 2005/0237447 | A1 | 10/2005 | Ono |
| 2005/0253988 | A1 * | 11/2005 | Inoue et al. .................. 349/139 |

FOREIGN PATENT DOCUMENTS

| JP | A-2002-221736 | 8/2002 |
| JP | A 2003-308951 | 10/2003 |
| JP | A 2005-234527 | 9/2005 |
| JP | A-2005-309052 | 11/2005 |
| KR | 2002-0028477 A | 4/2002 |
| KR | 2002-0053573 A | 7/2002 |
| KR | 10-2004-0007064 A | 1/2004 |

* cited by examiner

*Primary Examiner*—Frank G Font
*Assistant Examiner*—Michael P Mooney
(74) *Attorney, Agent, or Firm*—Oliff & Berridge, PLC (57) ABSTRACT

A liquid crystal device includes a first substrate and a second substrate facing each other and sandwiching a liquid crystal layer therebetween, a first electrode disposed on the first substrate at a side thereof proximate to the liquid crystal layer, a second electrode disposed above the first electrode with an insulating film therebetween, and an orientation film covering the insulating film and the second electrode. The second electrode includes a plurality of strip electrode segments each extending along the first and second substrates and having a connected end at one end of the strip electrode segment and an open end at the other end of the strip electrode segment, a connecting segment connecting the connected ends of the plurality of strip electrode segments together. The orientation film is given a rubbing treatment in a direction from the connected ends towards the open ends of the strip electrode segments.

8 Claims, 6 Drawing Sheets

LIQUID CRYSTAL DEVICE, METHOD FOR MANUFACTURING THE SAME, AND ELECTRONIC APPARATUS

BACKGROUND

1. Technical Field

The present invention relates to a liquid crystal device, a method for manufacturing the same, and an electronic apparatus.

2. Related Art

In the related art, a liquid crystal device using a horizontal electric field method has been proposed as a structure for addressing a problem of narrow viewing angle. As an example of such a liquid crystal device using the horizontal electric field method, a fringe field switching (FFS) mode liquid crystal device is known. JP-A-2003-308951 and JP-A-2005-234527 disclose examples of such an FFS mode liquid crystal device. In an FFS mode liquid crystal device, a first electrode and a second electrode are provided on one of a pair of substrates that sandwich a liquid crystal layer so as to drive the liquid crystal layer by using an electric field (horizontal electric field) occurring between the first and second electrodes.

In such an FFS mode liquid crystal device, a pixel design for achieving a high numerical aperture and a high transmittance is required. In order to reduce the area of dark regions not contributive to transmittance, a comb-shaped electrode having one open end can be employed as a structure of a pixel electrode. Thus, the numerical aperture and transmittance in the dark regions are improved.

JP-A-2003-308951 discloses an example of a liquid crystal device of the related art in which no signal lines are formed on the boundary between adjacent pixels (open-ended pixels).

JP-A-2005-234527 discloses another example of a liquid crystal device of the related art in which a polarizing axis and a rubbing axis are oriented in predetermined directions so as to eliminate unevenness in rubbing and afterimages caused by a voltage applied to a panel at a low gray-scale level and in a dark state.

However, a liquid crystal device including a comb-shaped electrode having one open end has a problem that unevenness in display or defective orientation of liquid crystal molecules due to unevenness in rubbing may occur when a voltage is applied to the liquid crystal.

SUMMARY

An advantage of some aspects of the invention is that a liquid crystal device, including a comb-shaped electrode having one open end, capable of suppressing occurrence of defective orientation and achieving a high numerical aperture, and a method for manufacturing such a liquid crystal device are provided.

In a liquid crystal device including a comb-shaped electrode having one open end, the present inventors found that an excessive pretilt angle given to liquid crystal molecules on an inclined surface of an orientation film causes defective orientation of the molecules, leading to leakage of light. Thus, the inventors have considered the invention characterized as follows.

According to an aspect of the invention, a liquid crystal device is provided, which includes a first substrate and a second substrate facing each other and sandwiching a liquid crystal layer therebetween, a first electrode disposed on the first substrate at a side thereof proximate to the liquid crystal layer, a second electrode disposed above the first electrode with an insulating film therebetween, and an orientation film covering the insulating film and the second electrode. The second electrode includes a plurality of strip electrode segments each extending along the first and second substrates and having a connected end at one end of the strip electrode segment and an open end at the other end of the strip electrode segment, and a connecting segment connecting the connected ends of the plurality of strip electrode segments together. The orientation film is given a rubbing treatment in a direction from the connected ends towards the open ends of the strip electrode segments.

A top surface of the second electrode and a top surface of the insulating film may have a step therebetween, and the orientation film may have an incline conforming to the step.

Accordingly, rubbing is performed on the incline of the orientation film near the connecting segment in the downward direction of the incline. Liquid crystal molecules on the incline are thus oriented downward at a pretilt angle in a direction from the top of incline towards the upper surface of the insulating film. This suppresses occurrence of defective orientation and prevents leakage of illuminating light, whereby a liquid crystal device with a high numerical aperture can be provided.

In the liquid crystal device according to the aspect of the invention, it is preferable that the plurality of strip electrode segments of the second electrode include a first strip electrode group and a second strip electrode group that are disposed in line symmetry in plan view. It is also preferable that the direction of the rubbing treatment on the orientation film be parallel to a symmetry axis for the first strip electrode group and the second strip electrode group.

Accordingly, a liquid crystal device having a so-called two-domain structure can be realized.

In the liquid crystal device according to the aspect of the invention, it is preferable that a light-shielding film be disposed so as to overlap at least a part of the connecting segment.

Accordingly, the light-shielding film can prevent leakage of illuminating light occurring near the connecting segment.

Another aspect of the invention provides a method for manufacturing a liquid crystal device that includes a first substrate and a second substrate facing each other and sandwiching a liquid crystal layer therebetween, a first electrode disposed on the first substrate at a side thereof proximate to the liquid crystal layer, a second electrode disposed above the first electrode with an insulating film therebetween, and an orientation film covering the insulating film and the second electrode. The method includes forming the second electrode including a plurality of strip electrode segments each extending along the first and second substrates and having a connected end at one end of the strip electrode segment and an open end at the other end of the strip electrode segment, and a connecting segment connecting the connected ends of the plurality of strip electrode segments together, and performing a rubbing treatment on the orientation film in a direction from the connected ends towards the open ends of the strip electrode segments.

Accordingly, rubbing is performed on the incline of the orientation film near the connecting segment in the downward direction of the incline. Liquid crystal molecules on the incline are thus oriented downward at a pretilt angle in a direction from the top of incline towards the upper surface of the insulating film. This suppresses occurrence of defective orientation and prevents leakage of illuminating light, whereby a liquid crystal device with a high numerical aperture can be provided.

In the method for manufacturing the liquid crystal device according to the aspect of the invention, it is preferable that a moving direction of the first substrate and a rotating direction of a rubbing roll used for the rubbing be the same at a contact point between the first substrate and the rubbing roll.

Accordingly, a rubbing cloth can assuredly reach the incline of the orientation film while the rubbing roll is being rotated, whereby rubbing can be properly performed on the incline of the orientation film.

Another aspect of the invention provides an electronic apparatus that includes the liquid crystal device described above.

Accordingly, an electronic apparatus having a display unit with a high numerical aperture can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Liquid Crystal Device

With reference to the drawings, a liquid crystal device according to an embodiment of the invention will now be described.

A liquid crystal device according to the embodiment employs a horizontal electric field method, in which an electric field whose lines of flux are parallel to a substrate surface (horizontal electric field) is applied to liquid crystal to control the orientation of liquid crystal molecules and to thus display images. The liquid crystal device according to the embodiment employs an FFS mode among various horizontal electric field methods. The liquid crystal device is a color liquid crystal device having a color filter on a substrate. In such a color liquid crystal device, three sub-pixels that emit red (R), green (G), and blue (B) color light, respectively, constitute one pixel. Accordingly, in the embodiment, a display area that is the smallest unit constituting an image will be referred to as a "sub-pixel areas, and a display area including a group of R, G, and B sub-pixels will be referred to as a "pixel area".

Figure 1:
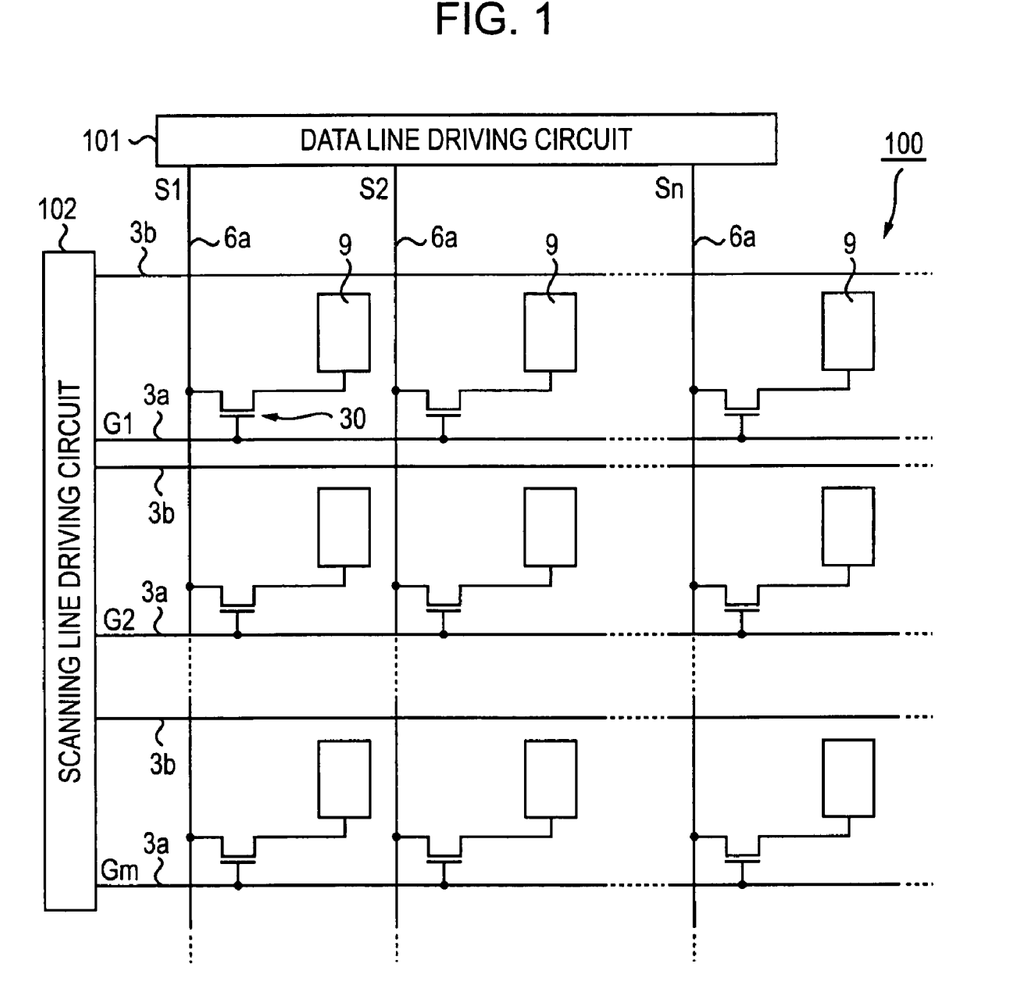
FIG. 1 is an equivalent circuit diagram of a liquid crystal device according to an embodiment of the invention.
Figure 2:
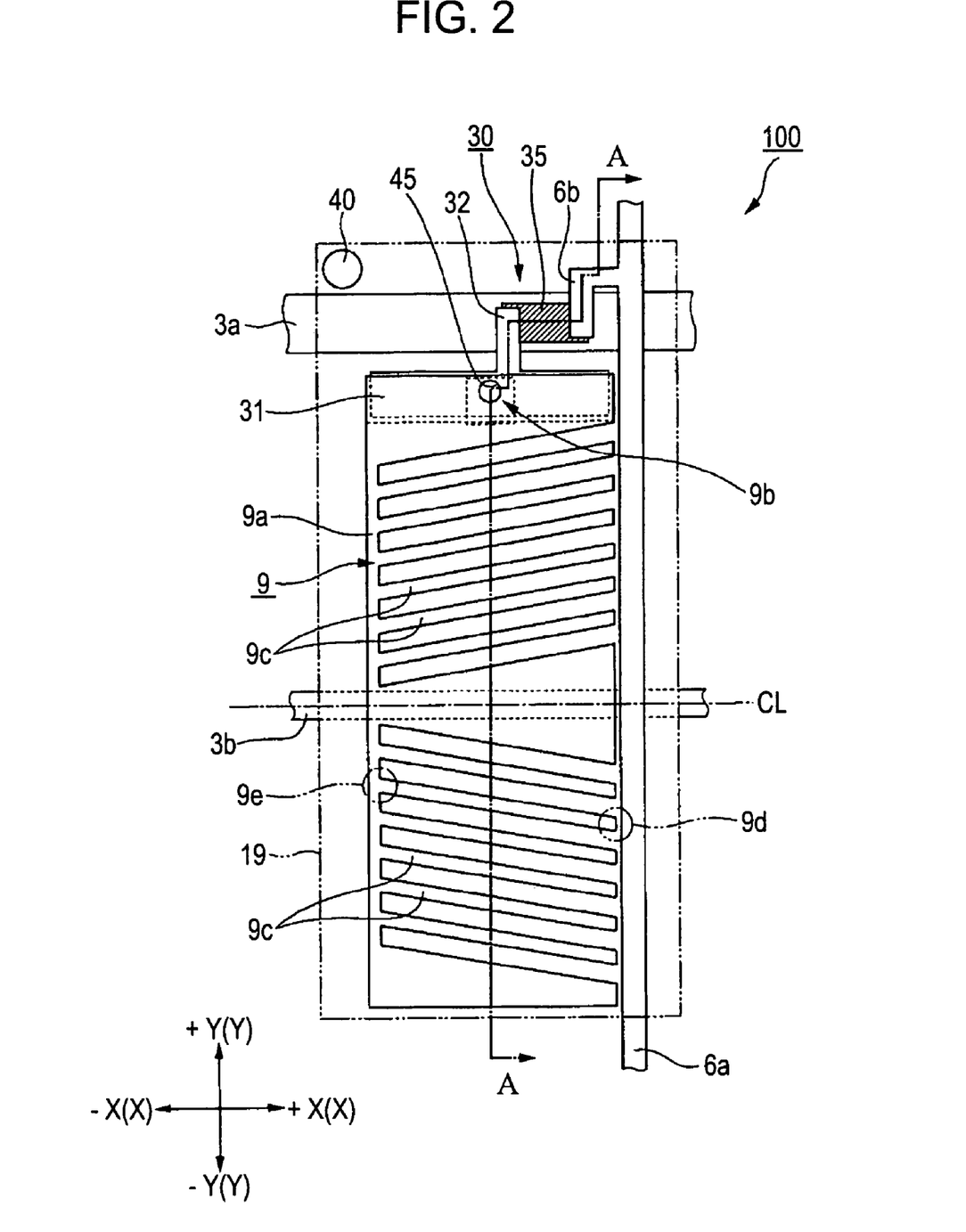
FIG. 2 is a plan view showing the configuration of one of sub-pixels of the liquid crystal device according to the embodiment of the invention.
Figure 3:
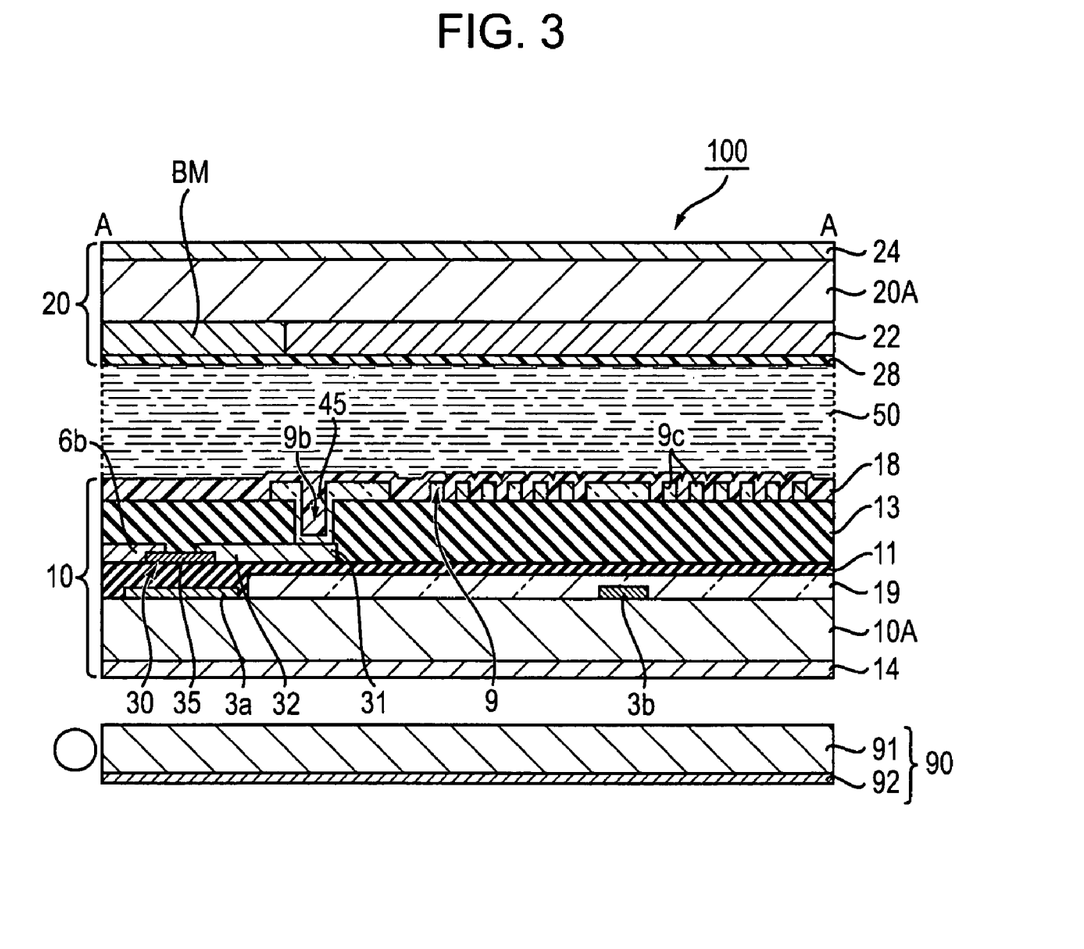
FIG. 3 is a sectional view taken along line A-A in FIG. 2.
Figure 4A:
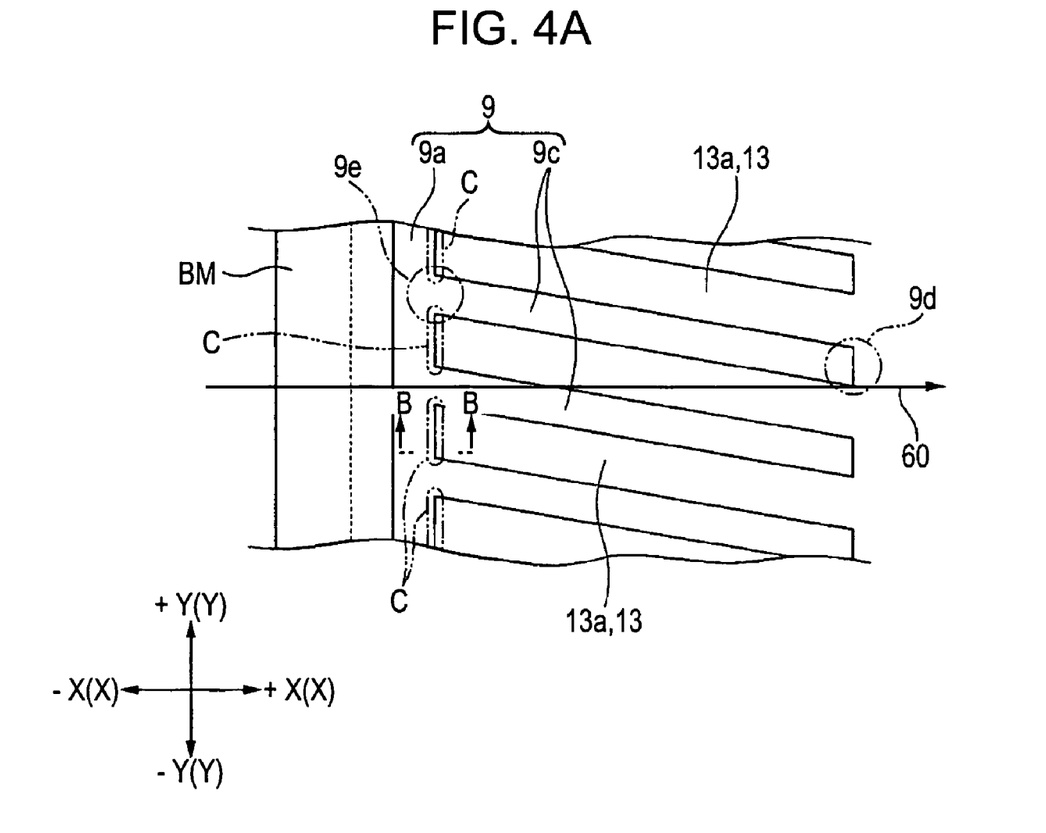
FIGS. 4A and 4B are enlarged views showing a relevant part of the liquid crystal device according to the embodiment of the invention.
Figure 4B:
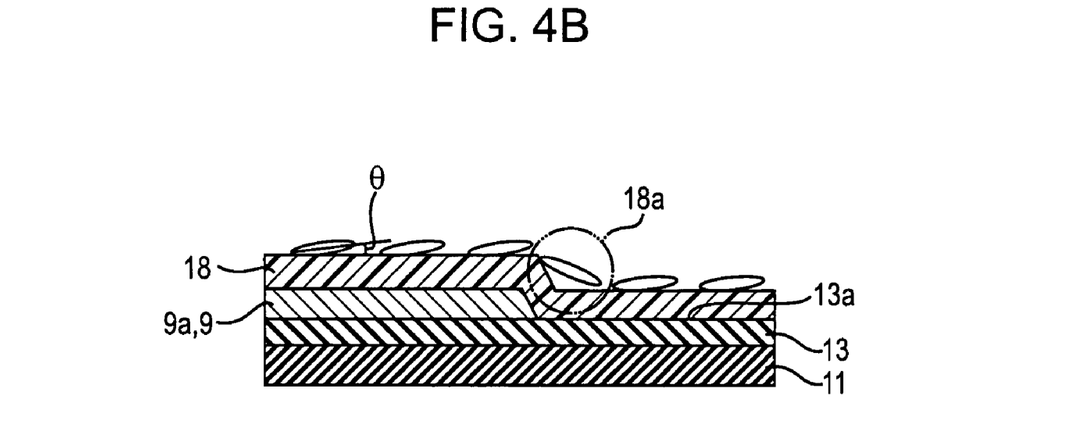

FIG. 1 is a circuit diagram of a liquid crystal device 100 according to the embodiment which includes a plurality of sub-pixels arranged in a matrix. FIG. 2 is a plan view showing one of the sub-pixels of the liquid crystal device 100. FIG. 3 is a partial sectional view taken along line A-A in FIG. 2. FIG. 4A is an enlarged plan view that shows a relevant part of a pixel electrode included in the liquid crystal device 100. FIG. 4B is a partial sectional view taken along line B-B in FIG. 4A.

Referring to FIG. 3, the liquid crystal device 100 according to the embodiment includes a thin film transistor (TFT) array substrate (first substrate) 10 and an opposing substrate (second substrate) 20 facing each other, and a liquid crystal layer 50 sandwiched between the substrates 10 and 20. A backlight 90 is disposed at the outer surface side of the TFT array substrate 10, thereby constituting a transmissive liquid crystal device.

In the drawings, layers and components are illustrated in various scales in order to show them with a recognizable size.

Referring to FIG. 1, a plurality of sub-pixel areas are arranged in a matrix to constitute an image display area of the liquid crystal device 100. The sub-pixel areas have pixel electrodes 9 and TFTs 30 electrically connected to the pixel electrodes 9 to switch-control the sub-pixels. Data lines 6a extending from a data line driving circuit 101 are electrically connected to sources of the TFTS 30. The data line driving circuit 101 supplies image signals S1, S2, ..., Sn to the pixels through the data lines 6a. The image signals S1 to Sn may be supplied in this order in a line sequential manner or may be supplied to groups of adjacent data lines 6a.

Scanning lines 3a extending from a scanning line driving circuit 102 are electrically connected to gates of the TFTs 30. The scanning line driving circuit 102 supplies pulsed scanning signals G1, G2, ..., Gm to the scanning lines 3a at a predetermined timing. Specifically, the scanning signals G1, G2, ..., Gm are applied to the gates of the TFTs 30 in this order in a line sequential manner. Pixel electrodes 9 are electrically connected to drains of the TFTs 30. When the TFTs 30 that function as switching elements receive the scanning signals G1, G2, ..., Gm so as to be turned on for a certain period of time, the image signals S1, S2, ..., Sn supplied from the data lines 6a are written into the pixel electrodes 9 at a predetermined timing.

The image signals S1, S2, ..., Sn of predetermined levels are written into the liquid crystal through the pixel electrodes 9 and are held for a certain period of time between the pixel electrodes 9 and a common electrode facing each other with the liquid crystal interposed therebetween. Further, common lines 3b are provided for maintaining the electric potential of the common electrode at a certain value.

Referring to FIG. 2, each of the sub-pixel areas of the liquid crystal device 100 has a pixel electrode (second electrode) 9 and a common electrode (first electrode) 19.

pixel electrode 9 has a substantially comb-like shape in plan view. The common electrode 19 underlies the pixel electrodes 9, and extends in the horizontal direction (X axis direction) in the drawing. A columnar spacer 40 for maintaining a predetermined distance between the TFT array substrate 10 and the opposing substrate 20 is provided at the top left corner of the sub-pixel area shown in FIG. 2 or is provided between adjacent sub-pixel areas.

In FIG. 2, the direction in which the scanning lines 3a extend is defined as the X axis direction, and the direction in which the data lines 6a extend is defined as the Y axis direction.

Each pixel electrode 9 includes a plurality of strip electrode segments 9c and a connecting segment 9a for connecting the strip electrode segments 9c to one another.

The strip electrode segments 9c extend from the connecting segment 9a in a direction only toward the data line 6a (in +X direction) relative to the connecting segment 9a, but do not extend in the other direction (−X direction) relative to the connecting segment 9a.

The strip electrode segments 9c in each pixel electrode 9 are arranged line symmetrically with respect to a center line (axis of symmetry) CL extending parallel to the scanning line 3a (X axis direction) in FIG. 2.

More specifically, a plurality (six in FIG. 2) of the strip electrode segments 9c provided in a first region between the scanning line 3a and the center line CL (+Y region relative to the center line CL) extends obliquely at a predetermined acute angle relative to the center line CL and is arranged parallel to each other at equal intervals in the Y axis direction. The plurality of strip electrode segments 9c provided in the first region corresponds to a first strip electrode group of the invention.

A plurality (six in FIG. 2) of the strip electrode segments 9c provided in a second region opposite the first region across the center line CL (−Y region relative to the center line CL) extends obliquely at a predetermined acute angle relative to the center line CL and is arranged parallel to each other at equal intervals in the Y axis direction. The plurality of strip electrode segments 9c provided in the second region corresponds to a second strip electrode group of the invention.

Because the pixel electrode 9 has a comb-like shape, each of the strip electrode segments 9c has an open end 9d, which is the tip thereof, and a connected end 9e connected to the connecting segment 9a.

In the sub-pixel area, the connecting segment 9a is provided on a side opposite the side having the data line 6a, and extends in the Y axis direction. Further, the connected ends 9e of the plurality of strip electrode segments 9c are connected to the connecting segment 9a.

As mentioned above, in the sub-pixel area having this pixel electrode 9, the strip electrode segments 9c provided in the first region between the scanning line 3a and the center line CL (+Y region relative to the center line CL) extend obliquely at a predetermined acute angle relative to the center line CL and are arranged parallel to each other at equal intervals. Likewise, the strip electrode segments 9c provided in the second region opposite the first region across the center line CL (−Y region relative to the center line CL) extend obliquely at the same acute angle, although in another direction, relative to the center line CL. The sub-pixel area having such a plurality of strip electrode segments 9c has a so-called two-domain structure in which the liquid crystal can be driven in each domain.

The common electrode 19 is provided in a layer lower than the pixel electrodes 9 with an interlayer insulating film interposed therebetween. In other words, the common electrode 19 is provided between a substrate body 10A and the pixel electrodes 9. The common electrode 19 is formed of a conductive film composed of a transparent conductive material such as indium tin oxide (ITO).

Each sub-pixel area has the corresponding data line 6a extending in the Y axis direction, the corresponding scanning line 3a extending in the X axis direction, and the corresponding common line 3b extending parallel to the scanning line 3a so as to extend across the central portion of the sub-pixel. The TFTs 30 are provided in areas where the data lines 6a and the scanning lines 3a intersect. Each TFT 30 includes a semiconductor layer 35 made of an island-like amorphous-silicon film provided over a part of the corresponding scanning line 3a, and a source electrode 6b and a drain electrode 32 that partially overlie the semiconductor layer 35. The scanning line 3a functions as a gate electrode of the TFT 30 at a position underlying the semiconductor layer 35.

The source electrode 6b of the TFT 30 is substantially L-shaped in plan view such that the source electrode 6b branches out from the data line 6a towards the semiconductor layer 35. The drain electrode 32 extends from the semiconductor layer 35 toward the pixel electrode 9 (−Y direction relative to the semiconductor layer 35). A part of the drain electrode 32 has a substantially rectangular shape in plan view. A contact portion 9b of the pixel electrode 9 is disposed on this part of the drain electrode 32. The drain electrode 32 and the pixel electrode 9 are electrically connected through a pixel contact hole 45 provided at the position where the contact portion 9b overlies the drain electrode 32.

According to the sectional view shown in FIG. 3, the liquid crystal device 100 includes the TFT array substrate (first substrate) 10 and the opposing substrate (second substrate) 20 which are disposed facing each other, and the liquid crystal layer 50 sandwiched between the TFT array substrate 10 and the opposing substrate 20.

The liquid crystal layer 50 is sealed between the TFT array substrate 10 and the opposing substrate 20 with a sealant (not shown) attached along the edge of the TFT array substrate 10 and the opposing substrate 20. A polarizer 14 is disposed on an outer surface of the TFT array substrate 10 (i.e., the surface farthest from the liquid crystal layer 50) and a polarizer 24 is disposed on an outer surface of the opposing substrate 20. The backlight (an illuminating unit) 90 having a light source, a light-guiding plate 91, and a reflective plate 92 is provided near the back face (the lower surface in FIG. 3) of the TFT array substrate 10.

The TFT array substrate 10 has the substrate body 10A composed of, for example, glass, quartz, or plastic. The scanning lines 3a and the common lines 3b are provided on the inner surface of the substrate body 10A (i.e., the surface closer to the liquid crystal layer 50). In each sub-pixel area, as shown in FIG. 3, the common line 3b is covered with the common electrode 19 composed of a transparent conductive material such as ITO. The scanning line 3a and the common electrode 19 are covered with a gate insulating film 11. The semiconductor layer 35 composed of amorphous silicon is disposed on the gate insulating film 11. The source electrode 6b and the drain electrode 32 partially overlie the semiconductor layer 35. The semiconductor layer 35 is disposed facing the scanning line 3a across the gate insulating film 11. In this region where the semiconductor layer 35 and the scanning line 3a face each other, the scanning line 3a functions as a gate electrode of the TFT 30.

The semiconductor layer 35, the source electrode 6b, and the drain electrode 32 are covered with an interlayer insulating film 13. The pixel electrode 9 composed of a transparent conductive material such as ITO is disposed on the surface of the interlayer insulating film 13 on the surface facing the liquid crystal layer 50. The pixel electrode 9 and the interlayer insulating film 13 are covered with a first orientation film 18 composed of polyimide.

The surface profile of the first orientation film 18 conforms to those of the pixel electrode 9 and the interlayer insulating film 13. Specifically, the surface profile of the first orientation film 18 is formed in accordance with a step formed between the top surface of the interlayer insulating film 13 and the top surface of the pixel electrode 9. This results in the first orientation film 18 having an incline between an area where the pixel electrode 9 is formed and an area where the interlayer insulating film 13 is exposed.

The pixel contact hole 45 extends through the interlayer insulating film 13 to reach the drain electrode 32. The pixel contact hole 45 is located above a contact region 31 of the drain electrode 32 as shown in FIG. 3. A part of the contact portion 9b of the pixel electrode 9 is embedded in the pixel contact hole 45 so as to electrically connect the pixel electrode 9 to the drain electrode 32.

The opposing substrate 20 has a substrate body 20A composed of, for example, glass, quartz, or plastic. A color filter (CF) layer 22 and a light-shielding film BM are disposed on the inner surface of the substrate body 20A (i.e., the surface facing the liquid crystal layer 50). The CF layer 22 has a color filter allowing the sub-pixels to transmit light of different colors.

Alternatively, the CF layer 22 may be provided on the TFT array substrate 10.

The light-shielding film BM is disposed so as to overlap at least the TFT 30 when the liquid crystal device 100 is viewed from above in FIG. 3. In addition to being disposed to overlap the TFT 30, the light-shielding film BM is also located over the region between adjacent sub-pixels so as to prevent light of different colors transmitted through the CF layer 22 from becoming blended. Further, referring to FIG. 4A, the light-shielding film BM is disposed so as to cover a region of the connecting segment 9a that is to the left of the center of the connecting segment 9a (−X region relative to the center of the connecting segment 9a).

The CF layer 22 and the light-shielding film BM are covered with a second orientation film 28 composed of polyimide. The second orientation film 28 is given a rubbing treatment in a direction opposite to that of a rubbing treatment for the first orientation film 18. Specifically, the rubbing treatment for the first orientation film 18 is implemented in a direction from the connecting segment 9a towards the data line 6a (+X direction from the connecting segment 9a), whereas the rubbing treatment for the second orientation film 28 is implemented in the opposite direction.

In the embodiment of the invention, the liquid crystal constituting the liquid crystal layer 50 has a positive dielectric constant. For example, the liquid crystal used in the embodiment has a refractive index anisotropy $\Delta n$ of 0.1, a dielectric constant $\epsilon//$ of 10, and a dielectric constant $\epsilon\perp$ of 4.

As shown in FIG. 4A, the light-shielding film BM is disposed so as to cover a region of the connecting segment 9a that is to the left of the center of the connecting segment 9a of the pixel electrode 9 (−X region relative to the center of the connecting segment 9a).

The light-shielding film BM does not cover the right-side region of the connecting segment 9a (+X region relative to the center of the connecting segment 9a), which includes the connected ends 9e of the strip electrode segments 9C.

Referring to FIG. 4B, the first orientation film 18 conforms to the surface profiles of an upper surface 13a of the interlayer insulating film 13, and upper and side (inclined) surfaces of the connecting segment 9a. Therefore, the first orientation film 18 has an incline 18a along the side surfaces of the connecting segment 9a. The incline 18a is provided in a region indicated by a reference character C in FIG. 4.

In FIG. 4B, only the interlayer insulating film 13, the pixel electrode 9, and the first orientation film 18 are illustrated. Since the remaining elements are already illustrated in the sectional view of FIG. 3, they are not shown in FIG. 4B.

The first orientation film 18 is given a rubbing treatment in a direction indicated by an arrow 60 shown in FIG. 4A. This rubbing direction 60 substantially corresponds to the direction from the connected end 9e towards the open end 9d of the strip electrode segment 9c. Although a crossing angle between the longitudinal direction of each strip electrode segment 9c and the rubbing direction 60 is acute in this embodiment, the crossing angle may be set to an arbitrary angle except for a right angle.

As shown in FIG. 4B, by the above-mentioned rubbing, the liquid crystal molecules on the first orientation film 18 become oriented diagonally at a pretilt angle θ relative to the surface of the first orientation film 18. Since the rubbing is performed entirely over the exposed surface of the first orientation film 18, the incline 18a is also rubbed in the same manner as the flat surface of the first orientation film 18. When the inclined surface 18a undergoes the rubbing treatment, the liquid crystal molecules become oriented at a downward pretilt angle relative to the incline 18a. In other words, the liquid crystal molecules on the incline 18a become oriented in the downward direction from the top of the incline 18a towards the upper surface 13a of the interlayer insulating film 13.

The incline 18a is also formed around the open end 9d of the strip electrode segment 9c.

In the liquid crystal device 100 of this embodiment, optical elements may be arranged such that their optic axes are set in the following manner.

The polarizer 14 of the TFT array substrate 10 and the polarizer 24 of the opposing substrate 20 are disposed such that their transmission axes are orthogonal to each other. The transmission axis of the polarizer 24 extends parallel to the direction in which the first orientation film 18 is rubbed. The rubbing direction on the first orientation film 18 substantially crosses the principal direction of an electric field generated between the pixel electrodes 9 and the common electrode 19 (i.e., a direction orthogonal to the longitudinal direction of the strip electrode segment 9c). When a voltage is applied between the pixel electrodes 9 and the common electrode 19, the liquid crystal molecules initially oriented parallel to the rubbing direction turn, so as to be oriented in the principal direction of the electric field. On the basis of the difference between the liquid crystal molecules in the initially oriented state and the liquid crystal molecules in the oriented state under the applied voltage, the brightness of display is controlled.

In the liquid crystal device 100 of this embodiment, since the rubbing is performed in a direction from the connected ends 9e towards the open ends 9d of the strip electrode segments 9c, the liquid crystal molecules on the incline 18a are oriented at a downward pretilt angle relative to the incline 18a.

Consequently, compared to the case in which liquid crystal molecules are oriented upward relative to the incline 18a at a pretilt angle, this embodiment allows for less occurrence of defective orientation, prevention of leakage of illuminating light from the backlight 90, and a higher numerical aperture.

Also, in the liquid crystal device 100 employing the horizontal electric field method of this embodiment, the electrodes (the pixel electrodes 9 and the common electrode 19) are provided only on one of the substrates, and the liquid crystal is driven in response to a voltage applied to the pixel electrodes 9 and the common electrode 19. The first orientation film 18 in the TFT array substrate 10 having the pixel electrodes 9 and the common electrode 19 requires high orientation controllability for controlling the orientation of the liquid crystal molecules. On the other hand, the orientation controllability of the second orientation film 28 in the opposing substrate 20 having no electrodes may be slightly lower than that of the first orientation film 18. This is because the lower orientation controllability of the second orientation film 28 has substantially no effect on the image quality. Therefore, the invention is suitable for a horizontal-electric-field-type liquid crystal device in which electrodes for driving the liquid crystal are provided on only one of the substrates.

Although the above embodiment employs an FFS mode, a similar advantage can be achieved in a liquid crystal device employing an in-plane switching (IPS) mode in which liquid crystal is similarly driven in response to an electric field applied parallel to the substrate surfaces. In a case where the invention is applied to an IPS-mode liquid crystal device, the pixel electrodes 9 and the common electrode 19 having comb-like shapes are disposed so as to be interlocked with each other in plan view. In addition, the pixel electrodes 9 and the common electrode 19 have an interlayer insulating film therebetween in sectional view.

In each of the pixel electrodes 9 in the above embodiment, the connecting segment 9a extends along the Y axis, and the strip electrode segments 9c extend from the connecting segment 9a toward the data line 6a. However, the pixel electrode 9 is not limited to this structure. For example, the connecting segment 9a may extend along the X axis and the strip electrode segments 9c may extend in a region opposite to the scanning line 3a relative to the connecting segment 9a (−Y region relative to the connecting segment 9a extending along the X axis). In this case, the rubbing is performed on the first orientation film 18 in the region opposite to the scanning line 3a relative to the connecting segment 9a, starting from the connecting segment 9a (−Y region of the connecting segment 9a extending along the X axis) towards a direction away from the scanning line 3a.

Method for Manufacturing Liquid Crystal Device

Next, a method for manufacturing the liquid crystal device according to the embodiment will be described with reference to FIGS. 5 and 6.

Figure 5:
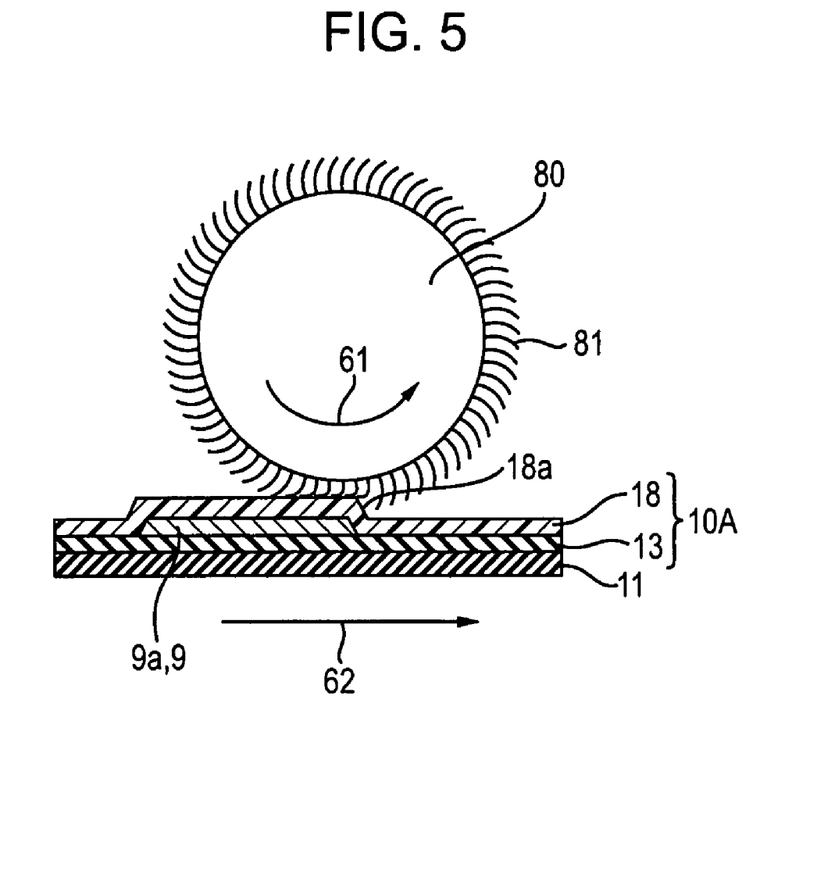
FIG. 5 is a sectional view illustrating a method for manufacturing the liquid crystal device according to the embodiment of the invention.

FIG. 5 is a partial sectional view taken along line B-B in FIG. 4A, and shows a step of performing rubbing on the first orientation film 18 included in the liquid crystal device 100.

Figure 6:
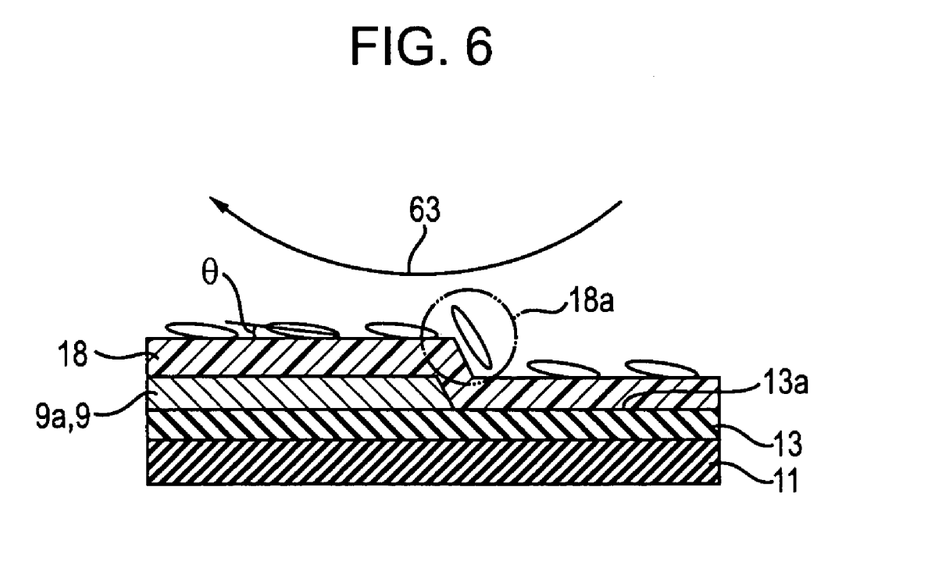
FIG. 6 illustrates a known rubbing technique.

FIG. 6 shows a comparative example where rubbing is performed in a direction opposite to that in the embodiment of the invention.

Steps performed prior to rubbing will be described first.

Referring to FIG. 5, each of the pixel electrodes 9 is formed on the interlayer insulating film 13. The formation of the pixel electrode 9 is performed by first forming a film of a transparent conductive material, such as ITO, on the entire surface of the interlayer insulating film 13 by means of deposition, and then patterning the deposited transparent conductive film by using a known photolithography technique. Thus, the above-described connecting segment 9a and the strip electrode segments 9c both having a flat shape are formed as part of the pixel electrode 9. In a region where the transparent conductive film is removed, the interlayer insulating film 13 is exposed.

In the step of forming a transparent conductive film by deposition, the transparent conductive material flows into the pixel contact hole 45, preliminarily formed in the interlayer insulating film 13, whereby the contact portion 9b of the pixel electrode 9 is formed in the pixel contact hole 45.

Next, the first orientation film 18 is formed over the exposed surfaces of the pixel electrode 9, including the top and side surfaces thereof, and over the exposed regions of the interlayer insulating film 13 not having the pixel electrode 9.

Examples of methods for forming the first orientation film 18 include forming a polyimide film by cyclodehydrating polyamic acid, or forming a polyimide film by vaporizing a solvent in a soluble polyimide solution. A specific exemplary method is such that, after a material for forming an orientation film containing polyamic acid or soluble polyimide is applied on a substrate by means of printing or spin coating, the applied material is subjected to preliminary firing and main firing, whereby a polyimide film is formed.

In a step of performing rubbing on the first orientation film 18, a rubbing roll 80 having a circular shape in cross-section is rotated in a direction indicated by a reference numeral 61, and the TFT array substrate 10 having the first orientation film 18 is moved relative to the rubbing roll 80, thereby causing a rubbing cloth 81 provided on the surface of the rubbing roll 80 to rub against the surface of the first orientation film 18.

In the embodiment, rubbing is performed in the direction from the connected ends 9e toward the open ends 9d of the strip electrode segments 9c, as mentioned above with reference to FIG. 4A. In the rubbing step, the direction 61 in which the rubbing roll 80 is rotated and a direction 62 in which the TFT array substrate 10 is moved relative to the rubbing roll 80 are the same at a position where the rubbing roll 80 and the first orientation film 18 come into contact with each other. This ensures that fibers of the rubbing cloth 81 can reach the incline 18a of the first orientation film 18 while the rubbing roll 80 is being rotated, whereby the rubbing can be properly performed on the incline 18a of the first orientation film 18.

After the TFT array substrate 10 is made according to the above-described steps, the TFT array substrate 10 and the opposing substrate 20 are bonded together with a sealant by using a known manufacturing method. Then, liquid crystal is injected into and sealed within the space enclosed by the TFT array substrate 10, the opposing substrate 20, and the sealant. Subsequently, the polarizers 14 and 24 are disposed on the outer surfaces of the substrate bodies 10A and 20A, respectively, and the backlight 90 is disposed near the outer surface side of the TFT array substrate 10. In this manner, the liquid crystal device 100 of the above embodiment can be manufactured.

The bonding step of the TFT array substrate 10 and the opposing substrate 20, the injecting step of the liquid crystal, the disposing step of the polarizers 14 and 24, the disposing step of the backlight 90, and the like can be performed by known techniques. Further, when the bonding step of the TFT array substrate 10 and the opposing substrate 20 is to be performed, the liquid crystal may be provided in advance on the opposing surfaces of the TFT array substrate 10 and the opposing substrate 20. In this case, the liquid crystal is sealed using a frame-like sealant having no sealing port.

In the method for manufacturing the liquid crystal device of the embodiment, since the rubbing described with reference to FIG. 5 is performed on the first orientation film 18, liquid crystal molecules on the incline 18a are oriented downward at a pretilt angle relative to the incline 18a shown in FIG. 4B.

In contrast, when rubbing is performed in a direction from the open ends 9d toward the connected ends 9e of the strip electrode segments 9c, that is, when rubbing is performed on the first orientation film 18 in the rotating direction indicated by a reference numeral 63 as shown in FIG. 6, the liquid crystal molecules cannot be oriented at a pretilt angle shown in FIG. 4B. In the case shown in FIG. 6, liquid crystal molecules on the incline 18a of the first orientation film 18 are oriented at an upward pretilt angle relative to the incline 18a. In other words, the liquid crystal molecules on the incline 18a are oriented at a pretilt angle relative to a direction from the bottom of the incline 18a toward the higher level of the first orientation film 18 (an upward direction). In such a case, light leakage due to defective orientation may easily occur.

As is obvious from the comparison of FIGS. 4B and 6, since rubbing is performed in a direction from the connected ends 9e toward the open ends 9d of the strip electrode segments 9c in the embodiment, liquid crystal molecules on the incline 18a of the first orientation film 18 can be oriented at a downward pretilt angle. Thus, the occurrence of defective orientation and light leakage near the incline 18a can be prevented, and a high numerical aperture can be realized.

In a region near another incline located at the connecting segment 9a, which is opposite the incline 18a, liquid crystal molecules are oriented at an upward pretilt angle. However, light leakage can be advantageously prevented because the light-shielding film BM is provided as shown in FIG. 4A.

Electronic Apparatus

Figure 7:
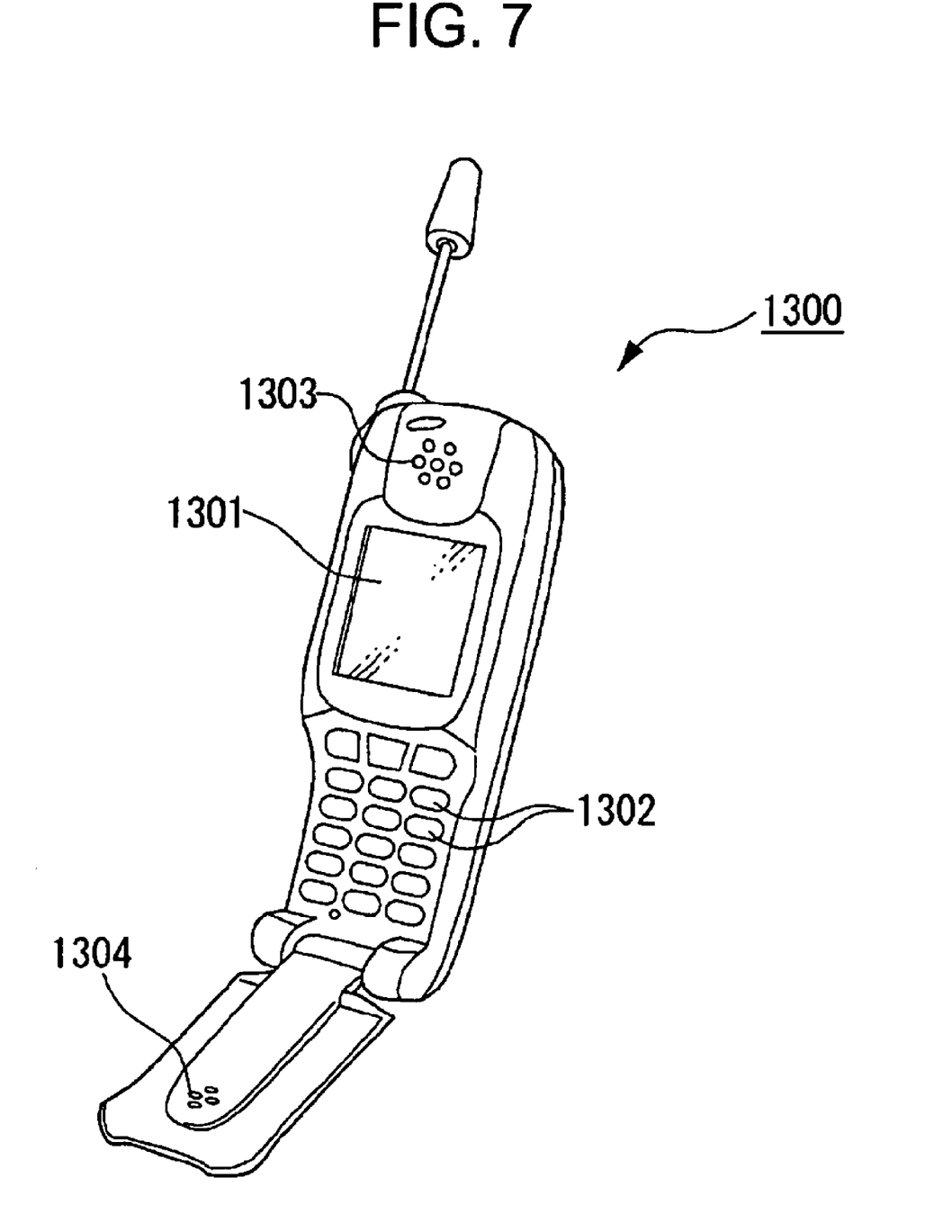
FIG. 7 is a perspective view showing an example of an electronic apparatus.

FIG. 7 is a perspective view showing an example of an electronic apparatus according to an embodiment of the invention. A mobile phone 1300 shown in FIG. 7 includes the liquid crystal device of the embodiment of the invention as a small display unit 1301, a plurality of operation buttons 1302, an earpiece 1303, and a mouthpiece 1304. Thus, the mobile phone 1300 having a display unit with an excellent display quality defined by the liquid crystal device of the embodiment of the invention can be provided.

The liquid crystal device of the embodiment is not limited to an image-displaying unit for the above mobile phone, but can be suitably used as an image-displaying unit for electronic books, personal computers, digital still cameras, liquid crystal televisions, view-finder-type or monitor-direct-view-type videotape recorders, car navigation systems, pagers, personal digital assistants, calculators, word processors, workstations, videophones, point-of-sale (POS) terminals, apparatuses having a touch panel, and the like. In any of these electronic apparatuses, a display with a high contrast and a wide viewing angle can be achieved.

The entire disclosure of Japanese Patent Application No. 2006-261096, filed Sep. 26, 2006 is expressly incorporated by reference herein.

What is claimed is:

1. A liquid crystal device, comprising:
    a first substrate and a second substrate facing each other and sandwiching a liquid crystal layer therebetween;
    a first electrode disposed on the first substrate at a side thereof proximate to the liquid crystal layer;
    a second electrode disposed above the first electrode with an insulating film therebetween; and
    an orientation film covering the insulating film and the second electrode,
    wherein the second electrode includes
        a plurality of strip electrode segments each extending along the first and second substrates and having a connected end at one end of the strip electrode segment and an open end at the other end of the strip electrode segment,
        a connecting segment connecting the connected ends of the plurality of strip electrode segments together, and
    wherein the orientation film is given a rubbing treatment in a direction from the connected ends towards the open ends of the strip electrode segments.

2. The liquid crystal device according to claim 1, wherein a surface of the liquid crystal layer side of the second electrode and a surface of the liquid crystal layer side of the insulating film have a step therebetween, and wherein the orientation film has an incline conforming to the step.

3. The liquid crystal device according to claim 1, wherein the plurality of strip electrode segments of the second electrode comprises a first strip electrode group and a second strip electrode group that are disposed in line symmetry in plan view.

4. The liquid crystal device according to claim 1, wherein the plurality of strip electrode segments of the second electrode comprises a first strip electrode group and a second strip electrode group that are disposed line symmetrically with respect to a symmetry axis in plan view, and
    wherein the direction of the rubbing treatment on the orientation film is parallel to the symmetry axis.

5. The liquid crystal device according to claim 1, wherein a light shielding film is disposed so as to overlap at least a part of the connecting segment.

6. A method for manufacturing a liquid crystal device including a first substrate and a second substrate facing each other and sandwiching a liquid crystal layer therebetween, a first electrode disposed on the first substrate at a side thereof proximate to the liquid crystal layer, a second electrode disposed above the first electrode with an insulating film therebetween, and an orientation film covering the insulating film and the second electrode, the method comprising:
    forming a second electrode including a plurality of strip electrode segments each extending along the first and second substrates and having a connected end at one end of the strip electrode segment and an open end at the other end of the strip electrode segment, and a connecting segment connecting the connected ends of the plurality of strip electrode segments, and
    performing rubbing on the orientation film in a direction from the connected ends towards the open ends of the strip electrode segments.

7. The method for manufacturing the liquid crystal device according to claim 6, wherein a moving direction of the first substrate and a rotating direction of a rubbing roll used for the rubbing are the same at a contact point between the first substrate and the rubbing roll.

8. An electronic apparatus comprising the liquid crystal device according to claim 1.

* * * * *